United States Patent
Singh et al.

(10) Patent No.: US 7,246,500 B2
(45) Date of Patent: Jul. 24, 2007

(54) VARIABLE SPEED CONDENSER FAN CONTROL SYSTEM

(75) Inventors: Abtar Singh, Kennesaw, GA (US); Thomas J. Mathews, Fayette, ME (US); Frank C. Brown, III, Blacksburg, VA (US); Ozgur Y. Gurkan, Kennesaw, GA (US)

(73) Assignee: Emerson Retail Services Inc., Kennesaw, GA (US)

( * ) Notice: Subject to any disclaimer, the term of this patent is extended or adjusted under 35 U.S.C. 154(b) by 0 days.

(21) Appl. No.: 11/260,878

(22) Filed: Oct. 27, 2005

(65) Prior Publication Data

US 2006/0130501 A1    Jun. 22, 2006

Related U.S. Application Data

(60) Provisional application No. 60/623,148, filed on Oct. 28, 2004.

(51) Int. Cl.
*F25D 17/00*    (2006.01)
*F25D 39/04*    (2006.01)

(52) U.S. Cl. .............................. 62/181; 62/183; 62/230

(58) Field of Classification Search .................. 62/181, 62/183, 230
See application file for complete search history.

(56) References Cited

U.S. PATENT DOCUMENTS

| 5,040,377 A | 8/1991 | Braun et al. |
| 6,257,007 B1 * | 7/2001 | Hartman ...................... 62/183 |
| 6,637,229 B1 * | 10/2003 | Forrest et al. ................ 62/230 |

* cited by examiner

*Primary Examiner*—Marc Norman
(74) *Attorney, Agent, or Firm*—Harness, Dickey & Pierce, P.L.C.

(57) ABSTRACT

A controller comprises a first input that receives a signal indicating an energy consumption value of a compressor, a second input that receives a signal indicating an energy consumption value of a variable speed condenser fan, and an output that provides a control signal to the variable speed condenser fan. The controller also comprises a memory that stores a condenser set point, and a processor in communication with the input, output and memory and that modulates the condenser set-point to minimize energy consumption and controls the variable speed condenser fan based on the condenser set-point.

35 Claims, 9 Drawing Sheets

VARIABLE SPEED CONDENSER FAN CONTROL SYSTEM

CROSS-REFERENCE TO RELATED APPLICATIONS

This application claims the benefit of U.S. Provisional Application No. 60/623,148 filed on Oct. 28, 2004. The disclosure of the above application is incorporated herein by reference.

FIELD

The present teachings relate to refrigeration systems and, more particularly, to a refrigeration system controller.

BACKGROUND

Refrigerated and frozen food product travels from processing plants to retailers, where the food product remains on display case shelves for an additional period of time. In general, the display case shelves are part of a refrigeration system for storing and displaying the refrigerated and frozen food product, which should be constantly cooled to ensure maximum product life. In the interest of efficiency, retailers attempt to maximize the shelf-life and quality of the stored food product while concurrently maximizing the efficiency of the refrigeration system. In so doing, retailers receive a profit through sales of quality products while minimizing spending on energy costs associated with product display (i.e., refrigeration, etc.).

The refrigeration system plays a key role in controlling the quality of the food product. Thus, any breakdown in the refrigeration system or variation in performance may cause food quality issues. Thus, it is important for the retailer to monitor the equipment of the refrigeration system to ensure it operates at expected levels.

Refrigeration systems generally require a significant amount of energy to operate. Therefore, energy requirements are a significant cost to retailers, especially when compounding energy uses across multiple retail locations. As a result, it is in the best interest of retailers to closely monitor performance of their refrigeration systems to maximize efficiency and reduce operational costs.

Monitoring refrigeration system performance and energy consumption are tedious and time-consuming operations. Generally speaking, retailers lack the expertise to accurately analyze time and temperature data and relate that data to food-product quality, as well as the expertise to monitor the refrigeration system for performance and efficiency. For example, retailers typically set refrigerated display cases at lower than necessary temperatures to protect against a breakdown or stoppage of the refrigeration system. The cooler temperatures keep the food product on display therein at a lower temperature, and thus, allow the retailer more time to repair the refrigeration system before the food product may spoil.

Decreasing the temperature of the food product translates directly into an increase in energy consumption as refrigeration components such as compressors, evaporator fans, and condenser fans draw more energy to reduce the temperature within the display case. As can be appreciated, consuming more energy results in higher energy costs. Because the increase in energy consumption does not necessarily lead to an improvement in the quality or safety of the food product itself, retailers cannot typically pass this additional cost to their customers and thus lose profit.

SUMMARY

A controller comprising a first input, a second input, an output, a memory and a processor is provided. The first input receives a signal indicating an energy consumption value of a compressor. The second input receives a signal indicating an energy consumption value of at least one variable speed condenser fan. The output provides a control signal to the variable speed condenser fan. The memory stores a condenser set-point. The processor is in communication with the input, output and memory and modulates the condenser set-point to minimize energy consumption. The processor controls the variable speed condenser fan based on the condenser set-point.

In other features, the variable speed condenser fan is driven by a variable frequency drive. The control signal indicates a frequency of electrical power for the variable frequency drive to deliver to an electric motor of the at least one variable speed condenser fan.

Further areas of applicability of the present teachings will become apparent from the detailed description provided hereinafter. It should be understood that the detailed description and specific examples are intended for purposes of illustration only and are not intended to limit the scope of the teachings.

BRIEF DESCRIPTION OF THE DRAWINGS

The present teachings will become more fully understood from the detailed description and the accompanying drawings, wherein.

DETAILED DESCRIPTION

The following description is merely exemplary in nature and is in no way intended to limit the teachings, its application, or uses. As used herein, the terms module, control module, and controller refer to an application specific integrated circuit (ASIC), an electronic circuit, a processor (shared, dedicated, or group) and memory that execute one or more software or firmware programs, a combinational logic circuit, and/or other suitable components that provide the described functionality. Further, as used herein, computer-readable medium refers to any medium capable of storing data for a computer. Computer-readable medium may include, but is not limited to, CD-ROM, floppy disk, magnetic tape, other magnetic medium capable of storing data, memory, RAM, ROM, PROM, EPROM, EEPROM, flash memory, punch cards, dip switches, or any other medium capable of storing data for a computer.

Figure 1:
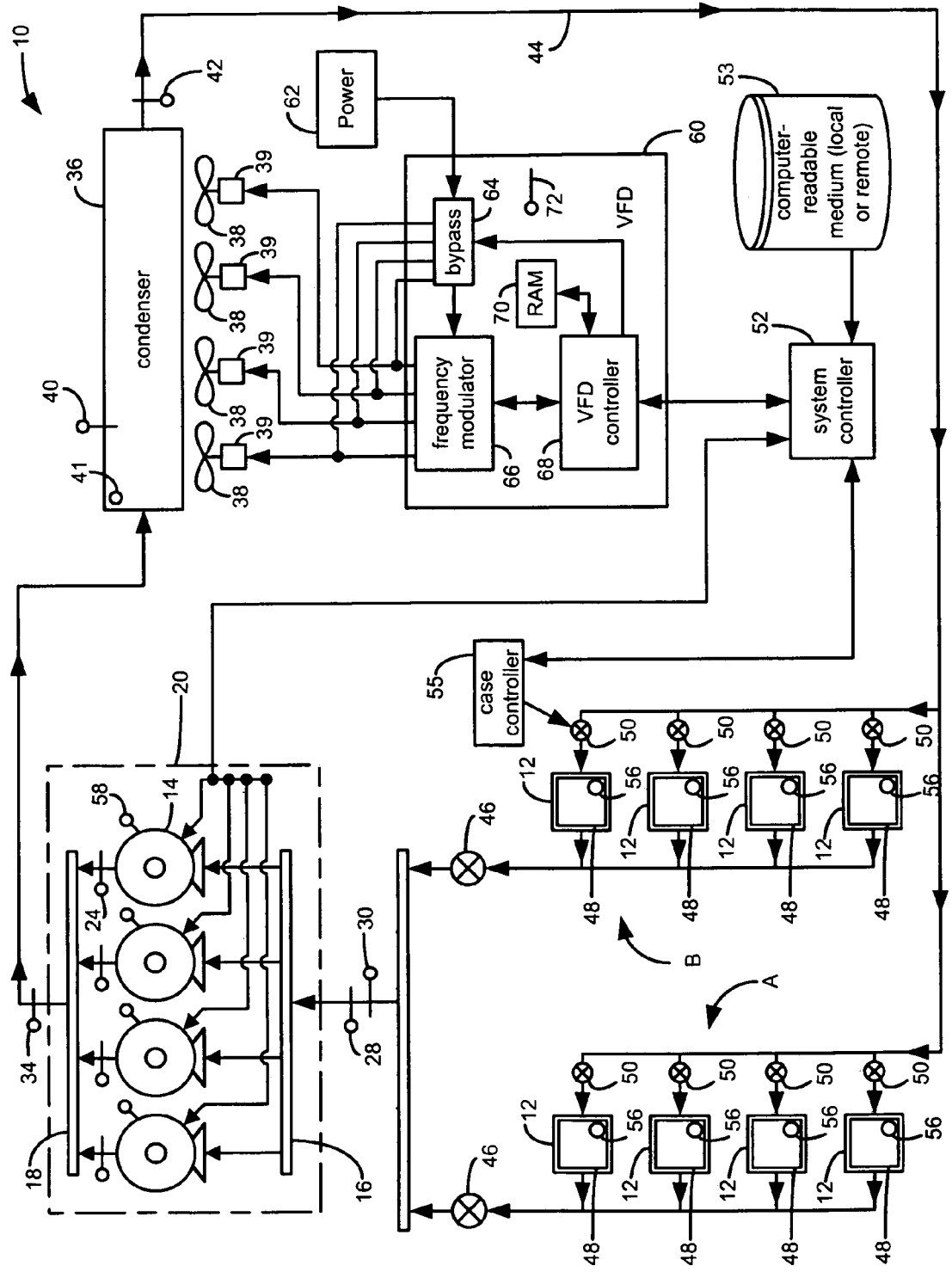
FIG. 1 is a schematic illustration of an exemplary refrigeration system.

With reference to FIG. 1, an exemplary refrigeration system 10 includes a plurality of refrigeration cases 12, as well as a plurality of compressors 14 piped together with a common suction manifold 16 and a discharge header 18 positioned within a compressor rack 20. A discharge output of each compressor 14 includes a respective compressor temperature sensor 24. An input to the suction manifold 16 includes both a suction pressure sensor 28 and a suction temperature sensor 30. Further, a discharge outlet of the discharge header 18 includes an associated compressor discharge pressure sensor 34. As described in further detail hereinbelow, the various sensors are implemented for controlling the refrigeration system components and evaluating energy requirements for the refrigeration system 10.

The compressor rack 20 compresses refrigerant vapor that is delivered to a condenser 36 where the refrigerant vapor is liquefied at high pressure, thereby rejecting heat to the outside air. Condenser fans 38 are associated with the condenser 36 to enable improved heat transfer from the condenser 36. The condenser 36 includes an associated ambient temperature sensor 40, a condenser temperature sensor 41, and a condenser discharge pressure sensor 42. The liquid refrigerant exiting the condenser 36 is delivered to the plurality of refrigeration cases 12 by way of piping 44. Each refrigeration case 12 is arranged in separate circuits consisting of a plurality of refrigeration cases 12.

FIG. 1 illustrates two circuits labeled A and B. Each circuit is shown consisting of four refrigeration cases 12. However, those skilled in the art will recognize that any number of circuits, as well as any number of refrigeration cases 12 within a circuit, may be employed. Each circuit will generally operate within a certain temperature range. For example, circuit A may be for frozen food, circuit B may be for dairy, etc.

Because the temperature requirement is different for each circuit, each circuit includes a pressure regulator 46 that acts to control the evaporator pressure and, hence, the temperature of the refrigerated space in the refrigeration cases 12. The pressure regulators 46 can be electronically or mechanically controlled. Each refrigeration case 12 also includes its own evaporator 48 and its own expansion valve 50 that may be either a mechanical or an electronic valve for controlling the superheat of the refrigerant. In this regard, refrigerant is delivered by piping 44 to the evaporator 48 in each refrigeration case 12.

The refrigerant passes through the expansion valve 50 where a pressure drop causes the high pressure liquid refrigerant to achieve a lower pressure combination of liquid and vapor. As hot air from the refrigeration case 12 moves across the evaporator 48, the low pressure liquid turns into gas, thereby removing heat from the refrigeration case 12. This low pressure gas is delivered to the pressure regulator 46 associated with that particular circuit. At the pressure regulator 46, the pressure is dropped as the gas returns to the compressor rack 20. At the compressor rack 20, the low pressure gas is again compressed to a high pressure gas, which is delivered to the condenser 36. The condenser 36 creates a high pressure liquid to supply to the expansion valve 50 to start the refrigeration cycle again.

A system controller 52 is used and configured or programmed to control the operation of the refrigeration system 10. The system controller 52 is preferably an Einstein Area Controller offered by CPC, Inc. of Atlanta, Ga., or any other type of programmable controller that may be programmed, as discussed herein. The system controller 52 operates according to computer executable instructions contained on a computer-readable medium 53 that may be local to the system controller 52 or located remotely. The system controller 52 controls the bank of compressors 14 in the compressor rack 20, as well as the condenser fans 38 to provide the desired suction pressure and to drive the condenser fans 38 at an optimum speed based on system performance. The system controller 52 may include a processor in communication with memory, such as RAM, ROM, EPROM, EEPROM, etc., that operate to control the condenser fans 38 and compressors 14. Operating data, such as a condenser set-point, may be stored by the system controller 52 in memory.

A separate case controller 55, such as a CC-100 case controller, also offered by CPC, Inc. of Atlanta, Ga. may be used to control the superheat of the refrigerant to each refrigeration case 12, via an electronic expansion valve in each refrigeration case 12 by way of a communication network or bus. A mechanical expansion valve may be used without separate case controller 55. Should separate case controllers 55 be utilized, the system controller 52 may be used to configure each separate case controller, also via the communication bus. The communication bus may be a RS-485 communication bus, a LonWorks Echelon bus, or other suitable communication bus that enables the system controller 52 and the separate case controllers 55 to receive information from each refrigeration case 12.

Each refrigeration case 12 may have a temperature sensor 56 associated therewith. The temperature sensor 56 can be electronically or wirelessly connected to the system controller 52, the case controller 55, or the expansion valve 50 for the refrigeration case 12. Each refrigeration case 12 in the circuit may have a separate temperature sensor 56 to take average/min/max temperatures. Alternatively, a single temperature sensor 56 in one refrigeration case 12 within the circuit may be used to control each refrigeration case 12 in the circuit since all of the refrigeration cases 12 in a given circuit operate at substantially the same temperature range.

Compressor current sensors 58 generate compressor current signals corresponding to the electrical current of each compressor. The compressor current signals are received by the system controller 52. Alternatively, electrical power meters may be used, in place of electrical current sensors, to generate signals corresponding to electrical power, for example in kilowatt-hours, being used by each compressor 14. As can be appreciated, other units can be used for energy consumption measurements. Moreover, any other suitable energy sensing device may be used to monitor energy consumption of the compressor. As can be further appreciated, any other suitable parameter corresponding to energy consumption may be used. For example, a control signal that directs the component to operate at a given level, such as a PID control signal. The control signal may direct the component to operate at a desired percentage of maximum operation. The system controller 52 may calculate energy consumption based on the control signal and known characteristics of the component.

The condenser fans 38 are variable-speed fans with electric, motors 39 that are driven by a variable frequency drive unit (VFD) 60, such as a Commander SE, offered by Control Techniques, of Minneapolis, Minn. The electric motors 39 may be single-phase, or three-phase, AC synchronous motors. As can be appreciated, other suitable adjustable speed drives may be used to drive the electric motors 39 of the condenser fans 38 at varying speeds. The condenser fan speed is directly correlated to the frequency delivered by the VFD 60. The VFD 60 receives electrical power of a given frequency, e.g., sixty hertz, from a power source 62. The power source 62 may deliver single, or polyphase, electric power suitable for the electric motors 39. For example, the power source 62 may deliver 3-phase sixty hertz electrical power to the VFD 60.

FIG. 1 depicts four condenser fans 38 with electric motors 39 connected to a single VFD 60. As can be appreciated, other electric motor 39 and VFD 60 configurations may be used. Any number of electric motors 39 may be connected to any number of VFD's 60.

The VFD 60 has bypass 64 and frequency modulator 66 modules controlled by a VFD controller 68. The VFD 60 may be operated in variable frequency drive mode (i.e., VFD-mode) or bypass-mode. In VFD-mode, electrical power is delivered to the electric motors 39 from the frequency modulator 66. In bypass-mode, electrical power is delivered from the bypass 64. In either mode, the VFD controller 68 selectively activates the electric motors 39, either at a variable frequency (VFD-mode), or at a fixed frequency (bypass-mode), in response to the system controller 52.

In VFD-mode, electrical power is passed around the bypass 64 to the frequency modulator 66 which delivers electrical power, at a desired frequency, to the electric motors 39. In bypass-mode, electrical power is delivered directly to the electric motors 39 by the bypass 64, which delivers electrical power that matches the frequency of the power source 62.

The frequency modulator 66 includes solid state electronics to modulate the frequency of the electrical power. Generally, the frequency modulator 66 converts the electrical power from AC to DC, and then converts the electrical power from DC back to AC at a desired frequency. For example, the frequency modulator 66 may directly rectify the electrical power with a full-wave rectifier bridge. The frequency modulator 66 may then chop the electrical power using insulated gate bipolar transistors (IGBT's) or thyristors to achieve the desired frequency. Other suitable electronic components may be used to modulate the frequency of electrical power from the power source 62.

Electric motor speed of each electric motor 39 is controlled by the frequency of the electrical power received from either the bypass 64 or the frequency modulator 66. In bypass mode, the electric motors 39 may receive 60 hertz power, resulting in full capacity operation. In VFD-mode, the electric motor capacity varies with the received electrical frequency. For example, at 30 hertz, the electric motors 39 operate at half capacity operation.

The VFD 60 includes a heat-sink temperature sensor 72 that generates a heat-sink temperature of the VFD 60. Modulating the frequency of electrical power results in some power loss in the form of heat. The VFD controller 68 monitors the heat-sink temperature. When the heat-sink temperature is above a predetermined heat-sink maximum temperature, the VFD 60 may be switched to bypass mode to allow the VFD 60 to cool. Additionally, the VFD 60 may be switched to bypass mode during periods of high ambient temperatures as well.

The VFD controller 68 controls the output frequency of the frequency modulator 66 and monitors various VFD 60 operating parameters. The VFD controller 68 monitors the electrical current and power drawn by each of the electric motors 39. Electrical current and power data is readily available to the VFD controller 68 from the frequency modulator 66, as the frequency modulator 66 generates the data while electronically manipulating the electrical power frequency. The monitored operating parameter data is stored by the VFD controller in RAM 70 accessible to the VFD controller 68. As can be appreciated, other computer-readable medium suitable for reading and writing data may be used instead of RAM 70. The operating parameter data is used by the VFD controller 68 during VFD operation.

Figure 2:
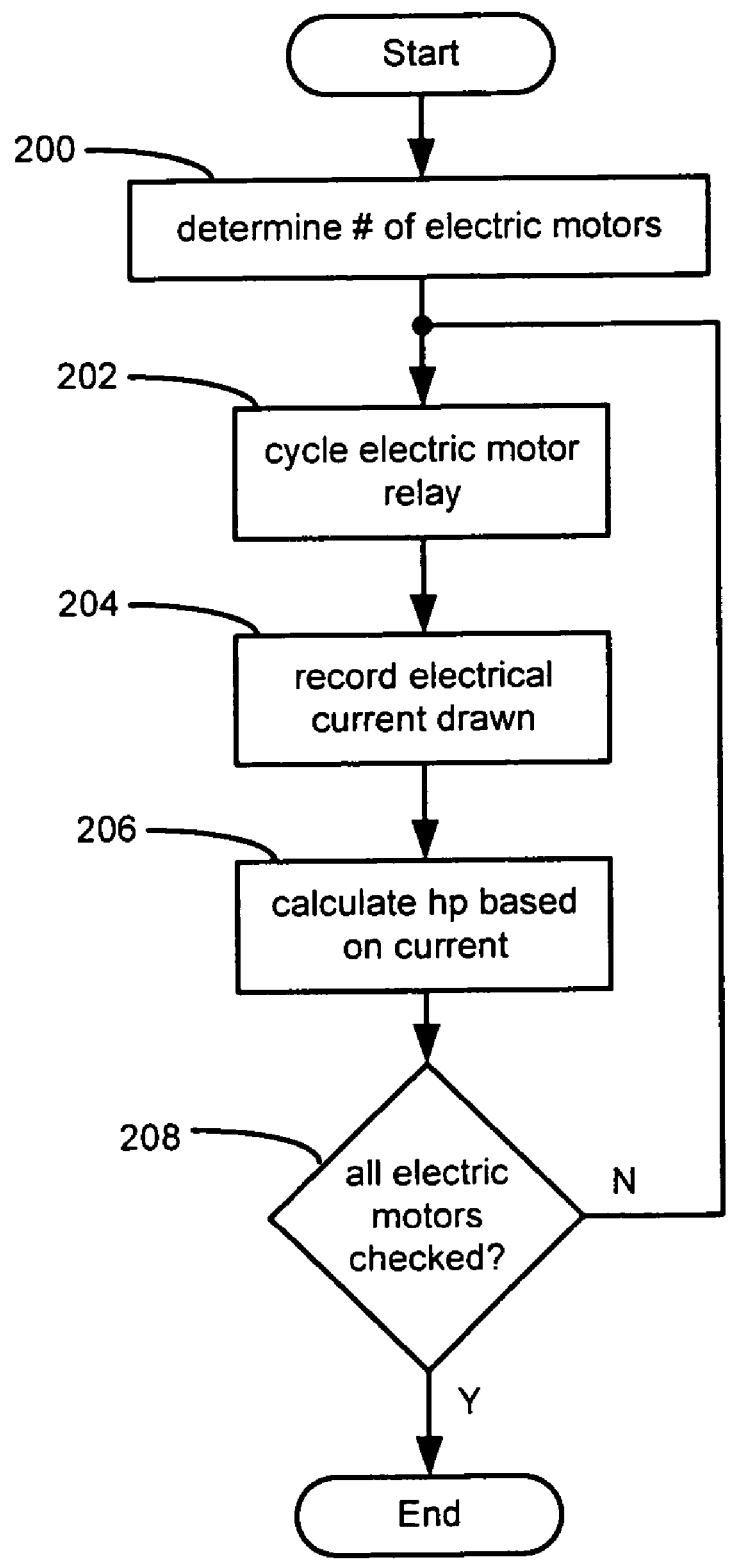
FIG. 2 is a flowchart illustrating an initialization algorithm for a variable frequency condenser fan drive.

Referring now to FIG. 2, certain electric motor 39 characteristics are determined on startup. The VFD 60 has electrical relays for each connected electric motor. On startup, the system controller 52 directs the VFD controller 68 to test each electric motor 39 individually to determine the number of condenser fans present, and the horsepower of each. In step 200, the VFD controller 68 determines the number of connected electric motors.

In step 202, the VFD controller, 68 cycles the relays for each electric motor 39, individually. In other words, the VFD controller 68 turns each electric motor 39 on one at a time. The VFD controller 68 monitors, and records, the electrical current drawn by each electric motor 39 during the test in step 204. This data is communicated to the system controller 52. In step 206, the system controller 52 calculates the horsepower of each electric motor 39 based on the electrical current drawn during the test. In step 208, when additional electric motors 39 remain to be tested, the VFD controller 68 loops back to step 202.

The system controller 52 controls condenser fan 38 staging based on the startup data, including the number of fans and horsepower data. As can be appreciated, one, or all, of the startup algorithm steps may be executed by the system controller 52, the VFD controller 68, or a combination of system controller 52 and VFD controller 68.

Further, the system controller 52 uses the startup data to detect a system malfunction during operation of the refrigeration system 10. For example, if a condenser fan 38 draws more electrical current than expected, the condenser 36 may be dirty or clogged. In such case, the system controller 52 may generate a notification of such. Additionally, if a condenser fan 38 does not draw enough current, the condenser fan 38 may be malfunctioning, and an appropriate notification may be generated.

The VFD 60 receives, stores, or communicates other VFD 60 operating data as well. For example, the frequency modulator 66 may encounter a fault condition involving the frequency modulator 66 electronics which may require maintenance. When the VFD controller 68 receives a fault condition, the VFD 60 is switched to bypass-mode. Further, as described above, when a high heat-sink temperature is encountered, the VFD 60 is switched to bypass mode.

When the VFD 60 is operating at, or near, full capacity, the VFD 60 is switched to bypass mode. In such case, because the desired frequency is at or near the frequency of electrical power delivered by the power source 62, there is no reason for the VFD 60 to modulate the frequency.

Other data may be programmed into the VFD controller 68 during manufacture or installation. For example, VFD model or serial number information may be stored by the VFD controller 68. In such case, a sufficient amount of non-volatile memory may be included on the VFD. Additionally, the size of the condenser fans 38 may be received by the VFD controller 68 at installation.

The system controller 52 communicates with the VFD controller 68 via a communication link, such as a ModBus, a RS-485 communication bus, a LonWorks Echelon bus, or other suitable network communication connection allowing digital data transfer. The communication link may be wired or wireless.

Traditionally, communications with the VFD 60 were made by way of an analog data connection. By communicating with the VFD controller 68 via a digital data connection, the system controller 52 is able to monitor the operation of the condenser fans 38 by monitoring condenser fan operation data contained in the VFD 60. More specifically, the system controller 52 is able to monitor the output frequencies, and consequently, the condenser fan 38 speeds. Further, the system controller 52 is able to monitor the electrical power and current data, i.e., energy consumption information, for each of the electric motors 39.

The system controller 52 monitors fault condition data from the VFD controller 68 as well. The system controller 52 is able to reset the VFD controller 68, and VFD electronics by way of a reset command to the VFD controller 68.

The system controller 52 monitors the energy consumption information of both the condenser 36, via the VFD controller 68, and the compressors 14, via the compressor current sensors 58. The energy consumption information is used by the system controller 52 to optimize the performance of the refrigeration system 10 to ensure that a desired cooling capacity is provided in each refrigeration case 12 while consuming a minimum amount of energy. Specifically, the system controller 52 monitors the energy consumption of the compressors 14 and the condenser 36 and controls condenser fan capacity to minimize the total energy consumption.

The system controller 52 may deliberately allow an increase in the energy used by the condenser fans 36, in order to reduce the energy used by the compressors 14 by a larger amount. In this way, the system controller 52 optimizes the total power consumed by the compressors 14 and condenser fans 36.

Condenser fan capacity refers to the cooling capacity of the condenser fans 38. In bypass-mode, the system controller 52 increases condenser fan capacity by turning one or more condenser fans 38 on, and decreases condenser fan capacity by turning one or more condenser fans 38 off. In VFD-mode, the system controller 52 increases condenser fan capacity by increasing the speed of one or more condenser fans, and decreases condenser fan capacity by decreasing the speed of one or more condenser fans.

In both VFD-mode and bypass-mode, the system controller 52 is able to adjust condenser fan capacity by staging condenser fan operation based on the horsepower of each of the electric motors 39 and based on condenser fan size, if known. In other words, if a small increment in condenser fan capacity is needed, a low horsepower electric motor 39 or a small size condenser fan 38 may be activated. If a large increment in condenser fan capacity is needed, a high horsepower electric motor 39 or a large size condenser fan 38 may be activated. In VFD-mode, the system controller 52 is also able to adjust condenser fan capacity by staging condenser fan operation based on condenser fan speed as well. If a small increment in condenser fan capacity is needed, a small increment to a condenser fan drive frequency is made. If a large increment in condenser fan capacity is needed, a large increment in a condenser fan drive frequency is made.

The system controller 52 optimizes total energy consumption by changing the condenser fan capacity and monitoring the corresponding change in total energy consumption. In this way, the system controller 52 finds the optimal condenser fan capacity.

The system controller 52 receives data from the respective temperature, pressure, and current sensors 24, 28, 30, 34, 40, 41, 42, 56, 58, and data from the VFD controller 68. Specifically, the system controller 52 receives: a suction pressure signal ($P_S$) generated by the suction pressure sensor 28, a suction temperature signal ($T_S$) generated by the suction temperature sensor 30, a compressor discharge pressure signal ($P_{D\text{-}Comp}$) generated by the compressor discharge pressure sensor 34, an ambient temperature signal (TA) generated by the ambient temperature sensor 40, a condenser temperature signal ($T_{Cond}$) generated by the condenser temperature sensor 41, and a condenser discharge pressure signal ($P_{D\text{-}Cond}$) generated by the condenser discharge pressure sensor 42. Additionally, the system controller 52 receives the compressor current signals from each of the compressor current sensors 58, and calculates a total compressor electrical current ($I_{Comp}$). Also, the system controller 52 receives the condenser fan current signals, or data, from the VFD controller 68 and calculates a total condenser fan electrical current ($I_{Cond}$). Because temperature can be calculated based on pressure, not all of the above sensors are necessary. For example, the refrigeration system 10 may not include the condenser temperature signal. In such case, the system controller 52 may calculate $T_{Cond}$ based on $P_{D\text{-}Cond}$.

Generally, when condenser fan capacity is increased, $P_{D\text{-}Cond}$ and $P_{D\text{-}Comp}$ decrease. When condenser fan capacity is decreased, $P_{D\text{-}Cond}$ and $P_{D\text{-}Comp}$ increase. When $P_{D\text{-}Comp}$ decreases, the load on the compressor 14 is decreased, and, consequently, $I_{Comp}$ decreases. At the same time, when condenser fan capacity is increased, $I_{Cond}$ also increases. The system controller 52 adjusts condenser fan capacity to minimize the total energy consumption, i.e., $I_{Comp} + I_{Cond}$.

Condenser fan capacity may be controlled by a set-point. For example, the set-point may be a condenser temperature set-point (Tsp). In such case, the system controller 52 compares $T_{Cond}$ with Tsp. When $T_{Cond}$ is greater than Tsp, the system controller 52 increases condenser fan capacity and when $T_{Cond}$ is less than Tsp, the system controller 52 decreases condenser fan capacity. The set-point may also be a condenser pressure set-point (Psp). In such case, the system controller 52 compares $P_{D\text{-}Cond}$ to the Psp, and adjusts the condenser fan capacity as needed. Condenser fan control based solely condenser temperature or pressure set-points, however, does not account for varying ambient temperatures.

The set-point may also be a temperature difference set-point (TD). In such case, the system controller 52 calculates a difference between $T_{Cond}$ and TA and compares the difference to TD. Condenser fan control based on TD accounts for varying ambient temperatures. $T_{Cond}$ is generally greater than TA. When the difference between $T_{Cond}$ and TA is less than TD, the system controller 52 decreases condenser fan capacity. When the difference between $T_{Cond}$ and TA is greater than TD, the system controller 52 increases fan capacity. Alternatively, the system controller 52 may calculate a difference between the ambient temperature and a condenser discharge saturation temperature, which is calculated based on the $P_{D\text{-}Cond}$.

Traditional refrigeration systems operate based on a fixed set-point, i.e., fixed Tsp, Psp, or TD. In the traditional system, the set-point remains constant despite varying refrigeration system loads and varying operating conditions.

The system controller 52 of the present teachings, on the other hand, modulates the condenser set-point to minimize total energy consumption. The system controller 52 varies the condenser set-point to adjust for varying refrigeration system loads while minimizing total energy consumption. The system controller 52 may store the condenser set-point in memory accessible to the system controller 52.

The system controller 52 may modulate the condenser set-point within a predetermined operating range, including condenser maximum and minimum temperatures. In this way, the system controller 52 insures that $T_{Cond}$ does not rise above a condenser temperature maximum. For example, when TD is used as the condenser set-point, $T_{Cond}$ rises with TA. Thus, if TD is 10 degrees and TA is 80 degrees, the resulting $T_{cond}$ may be 90 degrees. If TA rises to 90 degrees, the resulting $T_{Cond}$ may rise to 100 degrees. When $T_{Cond}$ reaches the condenser temperature maximum, the system controller 52 may simply control condenser fan capacity to lower $T_{Cond}$, despite the TD set-point and the rising TA. Further, the system controller 52 may check the condenser set-point against the condenser maximum and minimum temperatures each time the condenser set-point is modulated to insure the resulting $T_{Cond}$ will be within the range.

Because $T_{Cond}$ and $P_{D-Cond}$ vary with TA, the pressure and temperature of the refrigerant delivered to the refrigeration cases 12 may also vary. The temperature of the refrigerated space in the refrigeration cases 12 is maintained, however, by operation of the pressure regulators 46 and the expansion valves 50.

Figure 3:
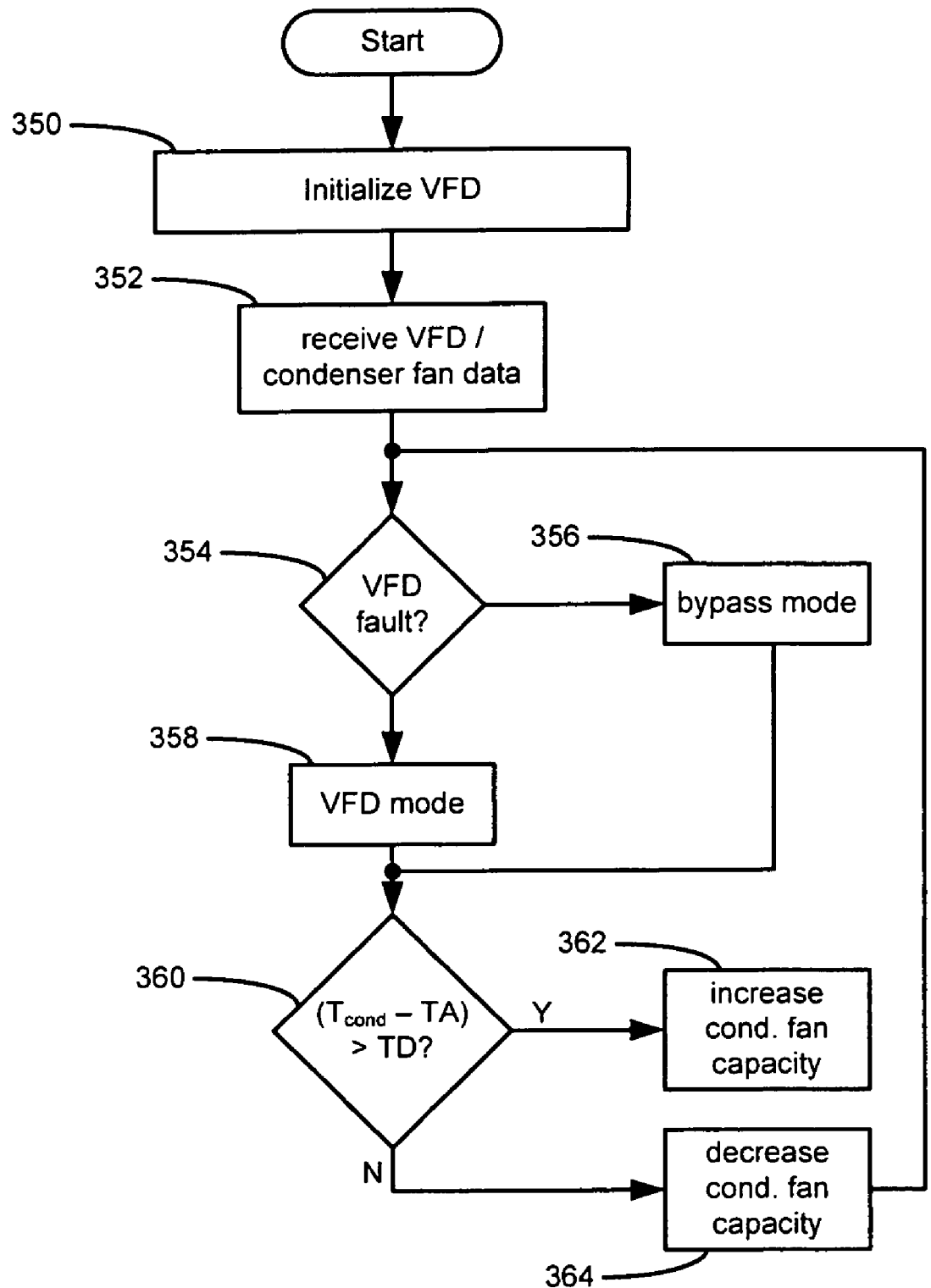
FIG. 3 is a flowchart illustrating a condenser fan control algorithm based on a temperature difference set-point.

With reference to FIG. 3, a control algorithm for adjusting condenser fan capacity based on a TD setpoint is executed by the system controller 52. In step 350, the system controller 52 initializes the VFD 60. Initialization includes calculating the horsepower rating of each electric motor, as described above. In step 352, the system controller 52 receives the VFD and condenser data from the VFD 60, such as, condenser fan size and electric motor horsepower.

In step 354, the system controller 52 determines whether a VFD fault has occurred. The fault may be an electronic fault, a high sink temperature fault, or other system fault. When a fault is detected, operation proceeds in bypass-mode in step 356. When a fault is not detected, operation proceeds in VFD-mode in step 358. In step 360, the system controller 352 compares the difference between $T_{Cond}$ and TA with TD. When the difference is greater than TD, condenser fan capacity is increased in step 362. When the difference is not greater than TD, condenser fan capacity is decreased in step 364. The system controller 52 then loops back to step 354. The manner in which the condenser fan capacity is increased or decreased depends on the mode selected in step 354. In bypass-mode, condenser fan capacity may be adjusted by turning an available condenser fan 38 on or off. In VFD-mode, condenser fan capacity may be adjusted by increasing or decreasing condenser fan speed.

Figure 4:
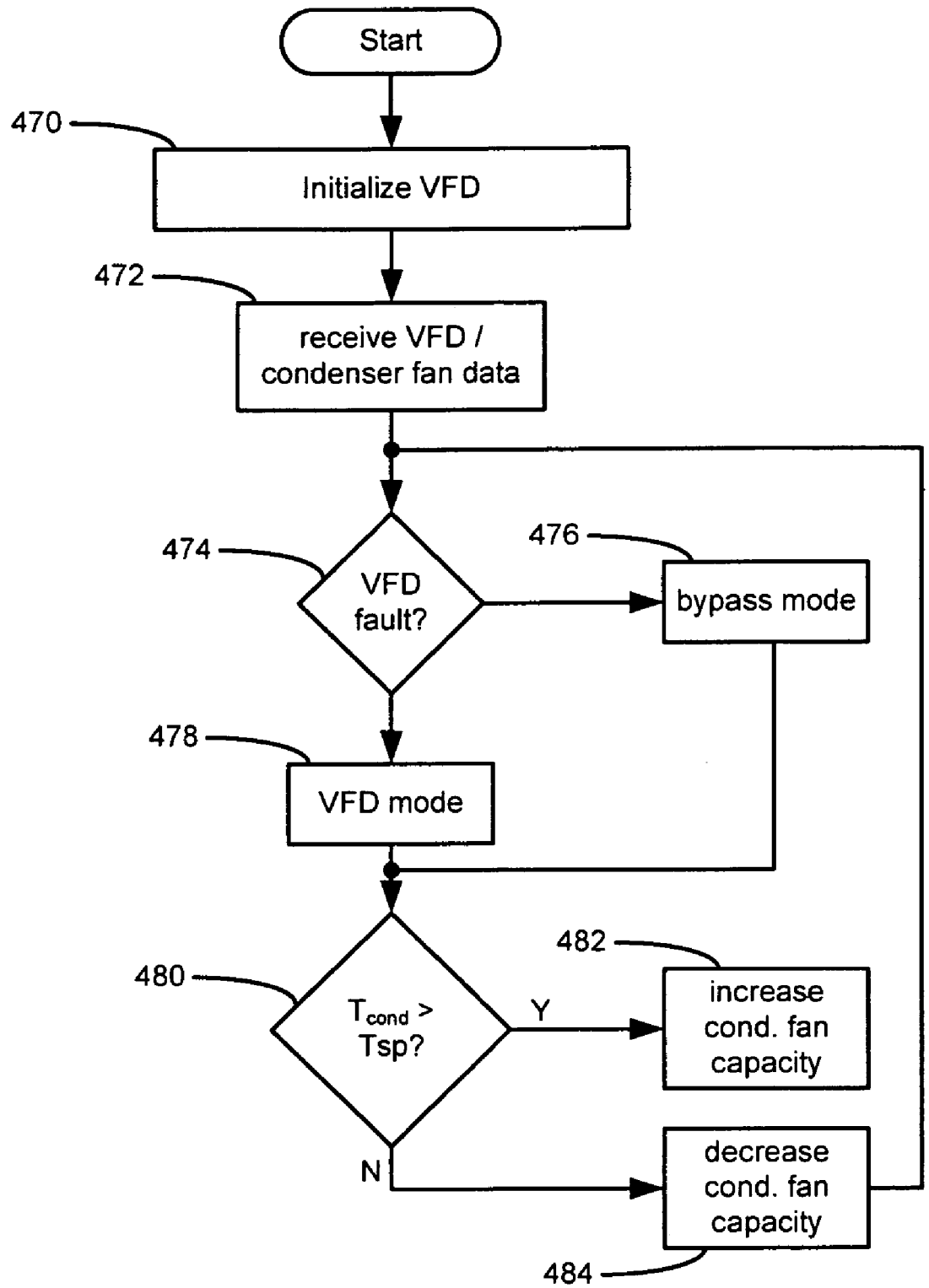
FIG. 4 is a flowchart illustrating a condenser fan control algorithm based on a condenser temperature set-point.

With reference to FIG. 4, a control algorithm for adjusting condenser fan capacity based on a Tsp set-point is executed by the system controller 52. In step 470, the system controller 52 initializes the VFD 60. In step 472, the system controller 52 receives the VFD and condenser data from the VFD 60.

In step 474, the system controller 52 determines whether a VFD fault has occurred. When a fault is detected, operation proceeds in bypass-mode in step 476. When a fault is not detected, operation proceeds in VFD-mode in step 478. In step 480, the system controller 52 compares $T_{Cond}$ with Tsp. When $T_{Cond}$ is greater than Tsp, condenser fan capacity is increased in step 482. When $T_{Cond}$ is not greater than Tsp, condenser fan capacity is decreased in step 484. The system controller 52 then loops back to step 474. The manner in which the condenser fan capacity is increased or decreased depends on the mode selected in step 474.

Figure 5:
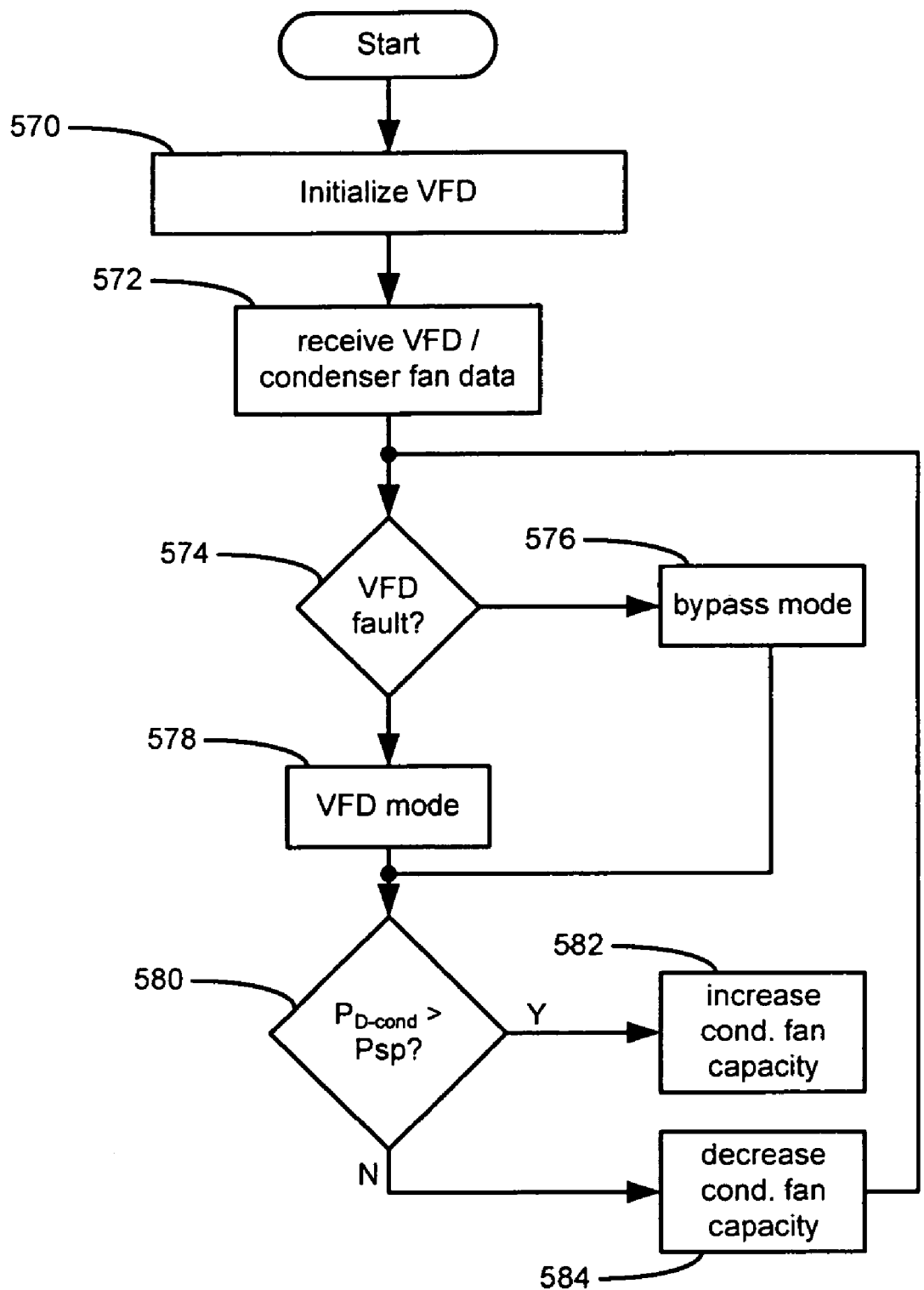
FIG. 5 is a flowchart illustrating a condenser fan control algorithm based on a condenser pressure set-point.

With reference to FIG. 5, a control algorithm for adjusting condenser fan capacity based on a Psp set-point is executed by the system controller 52. In step 570, the system controller 52 initializes the VFD 60. In step 572, the system controller 52 receives the VFD and condenser data from the VFD 60.

In step 574, the system controller 52 determines whether a VFD fault has occurred. When a fault is detected, operation proceeds in bypass-mode in step 576. When a fault is not detected, operation proceeds in VFD-mode in step 578. In step 580, the system controller 52 compares $P_{D-Cond}$ with Psp. When $P_{D-Cond}$ is greater than Psp, condenser fan capacity is increased in step 582. When $P_{D-Cond}$ is not greater than Psp, condenser fan capacity is decreased in step 584. The system controller 52 then loops back to step 574.

Figure 6:
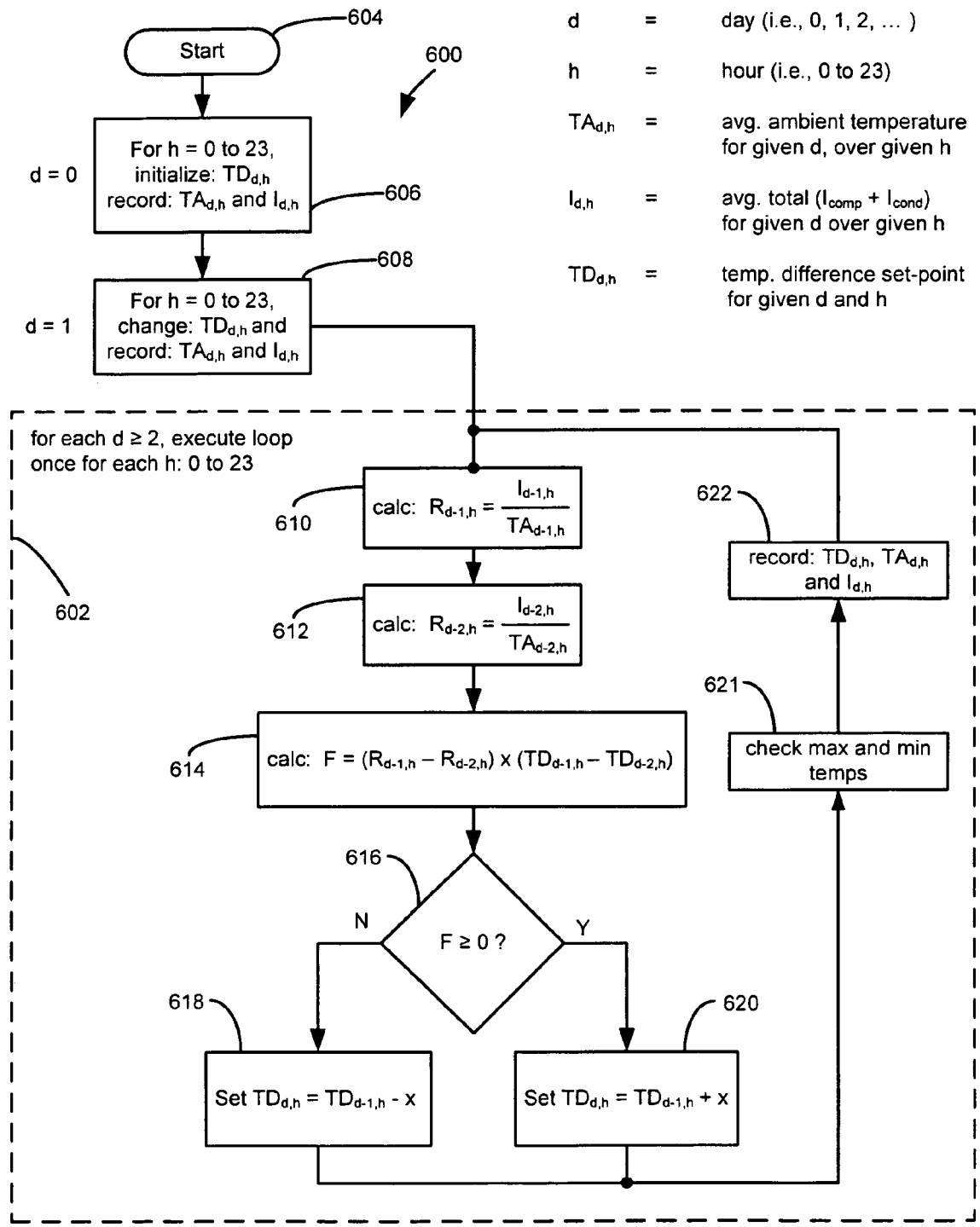
FIG. 6 is a flowchart illustrating a condenser fan control algorithm for modulating a temperature difference set-point.

With reference to FIG. 6, a control algorithm 600 for optimizing condenser fan capacity based on energy consumption using a TD setpoint is executed by the system controller 52. The control algorithm 600 is stored on the computer readable medium 53 accessible to the system controller 52. The system controller 52 includes time-keeping capabilities, such as a system clock, or the like. In this way, the system controller 52 is able to monitor the current day and time.

The control algorithm 600 includes an iteration loop 602 that is executed based on daily and hourly time periods. As can be appreciated, other iteration loop periods may be used. For example, the iteration loop 602 may be executed on a number-of-minutes basis. In FIG. 6, days (d) start at d=0, and increase by 1 for each passing day. Hours (h) start at 0, and increase by 1 for each passing hour, 0 to 23.

The system controller 52 monitors TA and records an average ambient temperature for a given hour of a given day ($TA_{d,h}$). Likewise, the system controller 52 monitors total current (i.e., $I_{Comp}+I_{Cond}$) and records an average total current for a given hour of a given day ($I_{d,h}$). Other energy consumption indicators, such as total kilowatt-hours, may alternatively be used. The system controller 52 modulates and records the TD set-point for a given hour of a given day ($TD_{d,h}$).

The system controller 52 begins in step 604. In step 606, the first day of operation, (i.e., d=0), $TD_{d,h}$ for each hour (i.e. h=0 to 23) is initialized to a predetermined initial value. The initial value may be 10 degrees for all hours of the day. The system controller 52 then records $TA_{d,h}$ and $I_{d,h}$ for each hour of the day.

In step 608, the second day of operation (i.e., d=1), the system controller 52 changes $TD_{d,h}$ for each hour (i.e., h=0 to 23) of the day. The change is for purposes of comparison between the first day and the second-day, and may simply comprise incrementing $TD_{d,h}$ by 1 degree for each hour of the day. Alternatively, the change may comprise decrementing $TD_{d,h}$ by 1 degree for each hour of the day.

By the end of the second day, the system controller 52 has recorded a first TD with corresponding ambient temperature and energy consumption data for each hour of the first day, and a second TD with corresponding ambient temperature and energy consumption data for each hour of the second day. The system controller 52 can then determine whether the change in TD increased or decreased total energy consumption for each hour of the day. Generally, the system controller 52 calculates an amps-per-degree ratio (R) by dividing the total current for a given hour (i.e., $I_{d,h}$) by the average ambient temperature for the given hour (i.e., $TA_{d,h}$). By comparing the amps-per-degree ratio resulting from different TD's, the system controller 52 can determine whether a given TD change increased or decreased the amps-per-degree ratio. By controlling TD to minimize the amps-per-degree ratio, the system controller 52 optimizes energy consumption of the refrigeration system.

As can be appreciated, other energy consumption indicators may be used in place of amps. In which case, the appropriate energy-temperature ratio is used by the system controller 52.

On day 3 (i.e., d=2), the system controller 52 enters the iteration loop 602. The loop is executed for each hour of the day. To set the $TD_{d,h}$, the system controller 52 compares data from the same hour of the previous 2 days.

In step 610, the system controller 52 calculates the amps-per-degree ratio for the same hour of the previous day: $R_{d-1,h}=I_{d-1,h}/TA_{d-1,h}$.

In step 612, the system controller 52 calculates the amps-per-degree ratio for the same hour of the day before the previous day: $R_{d-2,h}=I_{d-2,h}/TA_{d-2,h}$.

If the amps-per-degree ratio of the previous day is greater than the amps-per-degree ratio of 2 days ago, then the TD change between the 2 days was in the wrong direction. In other words, the TD change resulted in higher amps-per degree. If, on the other hand, the amps-per-degree ratio of the previous day is less than the amps-per degree ratio of 2 days ago, then the TD change was in the correct direction.

In step 614, the system controller 52 calculates a comparison factor (F) according to the formula: $F=(R_{d-1,h}-R_{d-2,h})\times(TD_{d-1,h}-TD_{d-2,h})$.

Essentially, the system controller 52 adjusts the current TD based on whether F is a positive or a negative number. For example, when energy consumption increases, $R_{d-1,h}-R_{d-2,h}$ will be a positive number. When energy consumption decreases, $R_{d-1,h}-R_{d-2,h}$ will be a negative number.

Likewise, when TD was increased, $TD_{d-1,h}-TD_{d-2,h}$ will be a positive number. When TD was decreased, $TD_{d-1,h}-TD_{d-2,h}$ will be a negative number.

Further, when energy consumption increased, and TD was increased, F will be positive, and TD should now be decreased. When energy consumption decreased, and TD decreased, F will be positive, and TD should now be decreased. When energy consumption increased, and TD was decreased, F will be negative, and TD should now be increased. When energy consumption decreased, and TD was increased, F will be negative, and TD should now be increased. Because the sign of F is the crucial information (i.e., whether F is positive or negative), F may also be calculated as a quotient instead of a product.

In step 616, the system controller 52 determines whether F is $\geq 0$. When F is not $\geq 0$, TD is decreased in step 618. In step 618, the system controller 52 sets $TD_{d,h}$ at $TD_{d-1,h}-x$, where x is an incremental value. In step 618, x may be a predetermined constant, for example 0.5 degrees, or 1.0 degree. Alternatively, x may be a calculated value that decreases over successive iterations of the iteration loop 602.

In step 616, when F is $\geq 0$, TD is increased in step 620. In step 620, the system controller 52 sets $TD_{d,h}$ at $TD_{d-1,h}+x$, where x is the incremental value.

In step 621, the system controller 52 checks TD against the predetermined maximum and minimum condenser temperatures. If the TD will result in a $T_{Cond}$ outside of the predetermined range, then the TD is adjusted in step 621 so that the resulting $T_{Cond}$ will be within the predetermined range.

After setting $TD_{d,h}$, the system controller 52 proceeds to step 622 and records the current $TD_{d,h}$, as well as the $TA_{d,h}$ and $I_{d,h}$ for the hour. At the end of the current hour, the system controller 52 proceeds again with step 610 and executes the iteration loop 602 again.

In this way, the system controller 52 optimizes the refrigeration system 10 by continually monitoring energy consumption of the refrigeration system 10, continually changing the TD, and continually evaluating the effect of the changed TD on energy consumption. The optimization occurs from day-to-day on an hourly basis, such that data from a given hour of the day is compared with data from the same hour of previous days. The optimization accounts for the load variations throughout the day on the refrigeration system 10.

The optimization also accounts for any sensor inaccuracies that may be present in the system. As can be appreciated, temperature sensors, pressure sensors, and the like, may be inaccurate by some constant amount. For example, a temperature sensor may be inaccurate by 2 or 3 degrees. A traditional system operating at a fixed temperature difference set-point will always operate at a temperature difference set-point that is off by 2 or 3 degrees.

A refrigeration system 10 operated by the system controller 52 according to the control algorithm 600 will operate at the most efficient temperature difference set-point, despite the inaccuracies of the temperature sensor. For example, if the most efficient temperature difference set-point is actually 10 degrees, and if the condenser temperature sensor 41 is off by 2 degrees, the system controller 52 will find the most efficient temperature difference set-point. To the system controller 52, the most efficient temperature difference set-point will appear to be 12 degrees, or 8 degrees, due to the inaccurate condenser temperature sensor 41. But the system controller 52 will operate at the most efficient temperature difference set-point nonetheless. Thus, by execution of the control algorithm 600, the system controller 52 operates at the optimized temperature difference set-point, despite the inaccurate sensor.

The system controller 52 executing the control algorithm 600 may adjust $TD_{d,h}$ within the $T_{Cond}$ maximum range. In such case, the system controller 52 may increase or decrease TD according to the control algorithm 600 until the resulting $T_{Cond}$ maximum has been reached.

Figure 7:
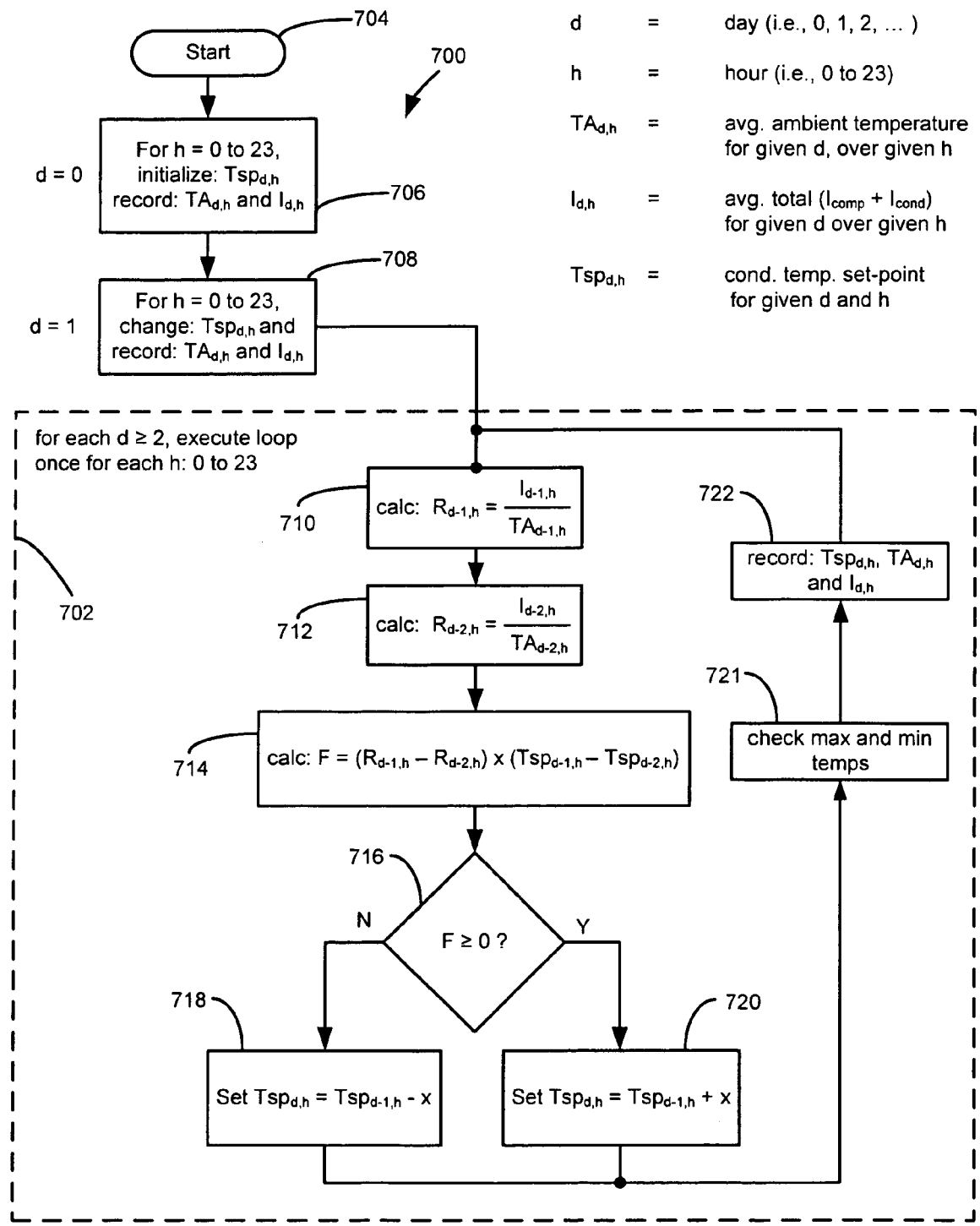
FIG. 7 is a flowchart illustrating a condenser fan control algorithm for modulating a condenser temperature set-point.

Referring now to FIG. 7, a control algorithm 700 for optimizing condenser fan capacity based on energy consumption using a condenser temperature set-point (Tsp) is executed by the system controller 52. The control algorithm 700 is stored on the computer readable medium 53 accessible to the system controller 52. The system controller 52 begins in step 704. In step 706, the system controller 52 initializes the Tsp's, and records $TA_{d,h}$ and $I_{d,h}$ for each hour of the first day. In step 708, the system controller 52 changes the Tsp's for each hour of the second day, and records $TA_{d,h}$ and $I_{d,h}$. The system controller 52 then enters the iteration loop 702 starting with step 710.

As in the control algorithm 600 for TD, the system controller 52 in step 710 calculates the amps-per-degree ratio of the previous day. In step 712 the system controller 52 calculates the amps-per-degree ratio of 2 days prior. In step 714, the system controller 52 calculates F according to the formula: $F=(R_{d-1,h}-R_{d-2,h})\times(Tsp_{d-1,h}-Tsp_{d-2,h})$.

In step 716, the system controller 52 determines whether F is $\geq 0$. When F is not $\geq 0$, Tsp is decreased in step 718. In step 718, the system controller 52 sets $Tsp_{d,h}$ at $Tsp_{d-1,h}-x$, where x is an incremental value.

In step 716, when F is $\geq 0$, Tsp is increased in step 720. In step 720, the system controller 52 sets $Tsp_{d,h}$ at $Tsp_{d-1,h}+x$, where x is the incremental value.

In step 721, the system controller 52 checks the resulting Tsp against the condenser maximum and minimum temperatures. If the Tsp is outside of the predetermined range, the system controller 52 adjusts Tsp to within the predetermined range.

After setting $Tsp_{d,h}$, the system controller 52 proceeds to step 722 and records the current $Tsp_{d,h}$, as well as the $TA_{d,h}$ and $I_{d,h}$ for the hour. At the end of the current hour, the system controller 52 proceeds again with step 710 and executes the iteration loop 702 again.

In this way, the system controller 52 optimizes the refrigeration system 10 by continually monitoring energy consumption of the refrigeration system 10, continually changing the Tsp, and continually evaluating the effect of the changed Tsp on energy consumption.

Figure 8:
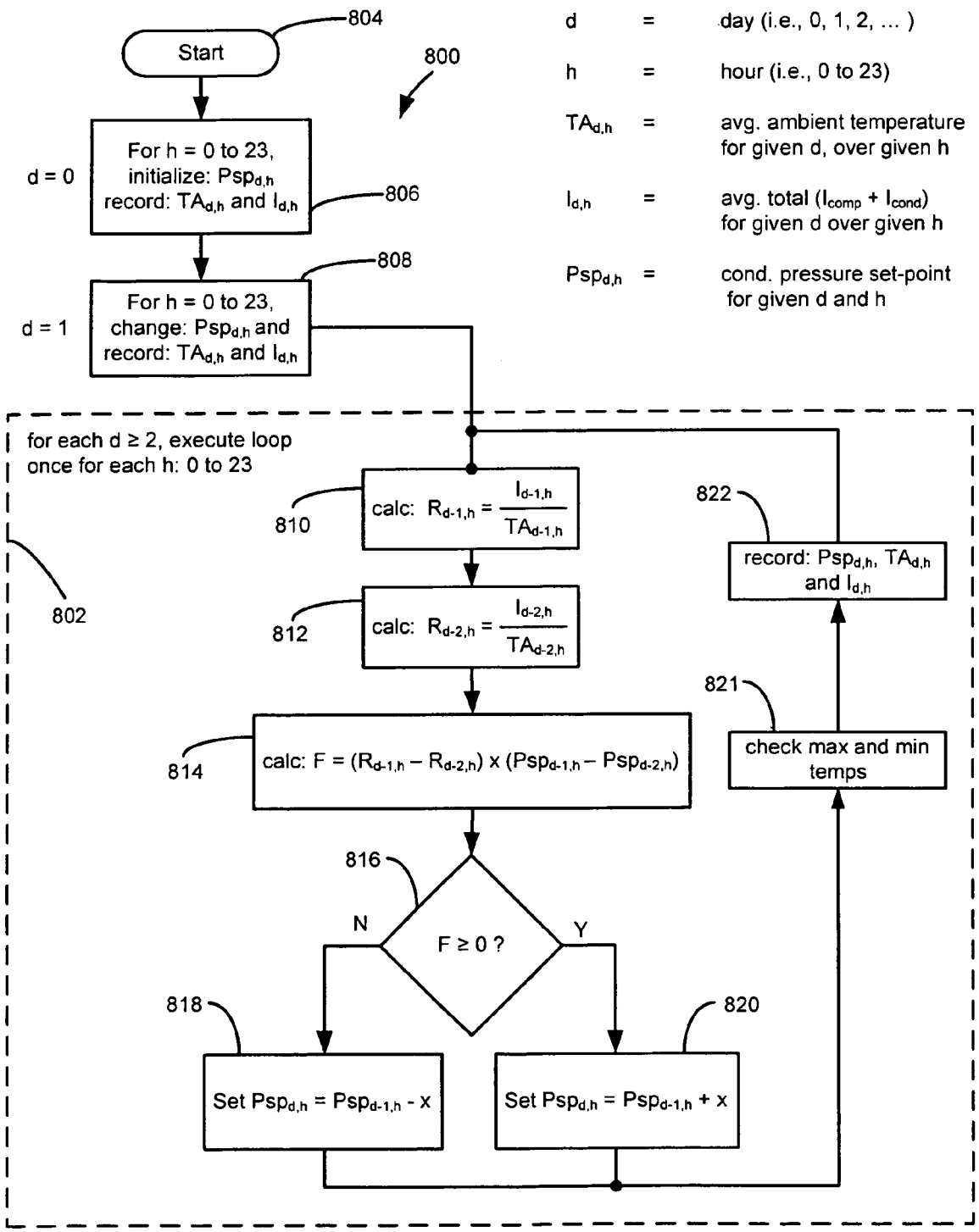
FIG. 8 is a flowchart illustrating a condenser fan control algorithm for modulating a condenser pressure set-point.

Referring now to FIG. 8, a control algorithm 800 for optimizing condenser fan capacity based on a condenser pressure set-point (Psp) is executed by the system controller 52. The control algorithm 800 is stored on the computer readable medium 53 accessible to the system controller 52. The system controller 52 begins in step 804. In step 806, the system controller 52 initializes the Psp's, and records $TA_{d,h}$ and $I_{d,h}$ for each hour of the first day. In step 808, the system controller 52 changes the Psp's for each hour of the second day, and records $TA_{d,h}$ and $I_{d,h}$. The system controller 52 then enters the iteration loop 802 starting with step 810.

As in the control algorithm 600 for TD, and the control algorithm 700 for Tsp, the system controller 52 in step 810 calculates the amps-per-degree ratio of the previous day. In step 812 the system controller 52 calculates the amps-per-degree ratio of 2 days prior. In step 814, the system controller 52 calculates F according to the formula: $F=(R_{d-1,h}-R_{d-2,h}) \times (Psp_{d-1,h}-Psp_{d-2,h})$.

In step 816, the system controller 52 determines whether F is $\geq 0$. When F is not $\geq 0$, Psp is decreased in step 818. In step 818, the system controller 52 sets $Psp_{d,h}$ at $Psp_{d-1,h}-x$, where x is an incremental value.

In step 816, when F is $\geq 0$, Psp is increased in step 820. In step 820, the system controller 52 sets $Psp_{d,h}$ at $Psp_{d-1,h}+x$, where x is the incremental value. In step 821 the system controller 52 checks the Psp against the predetermined maximum and minimum condenser operating pressures. If the Psp is outside of the predetermined range, the system controller 52 adjusts Psp to within the predetermined range.

After setting $Psp_{d,h}$, the system controller 52 proceeds to step 822 and records the current $Psp_{d,h}$, as well as the $TA_{d,h}$ and $I_{d,h}$ for the hour. At the end of the current hour, the system controller 52 proceeds again with step 810 and executes the iteration loop 802 again.

In this way, the system controller 52 optimizes the refrigeration system 10 by continually monitoring energy consumption of the refrigeration system 10, continually changing the Psp, and continually evaluating the effect of the changed Psp on energy consumption.

Figure 9:
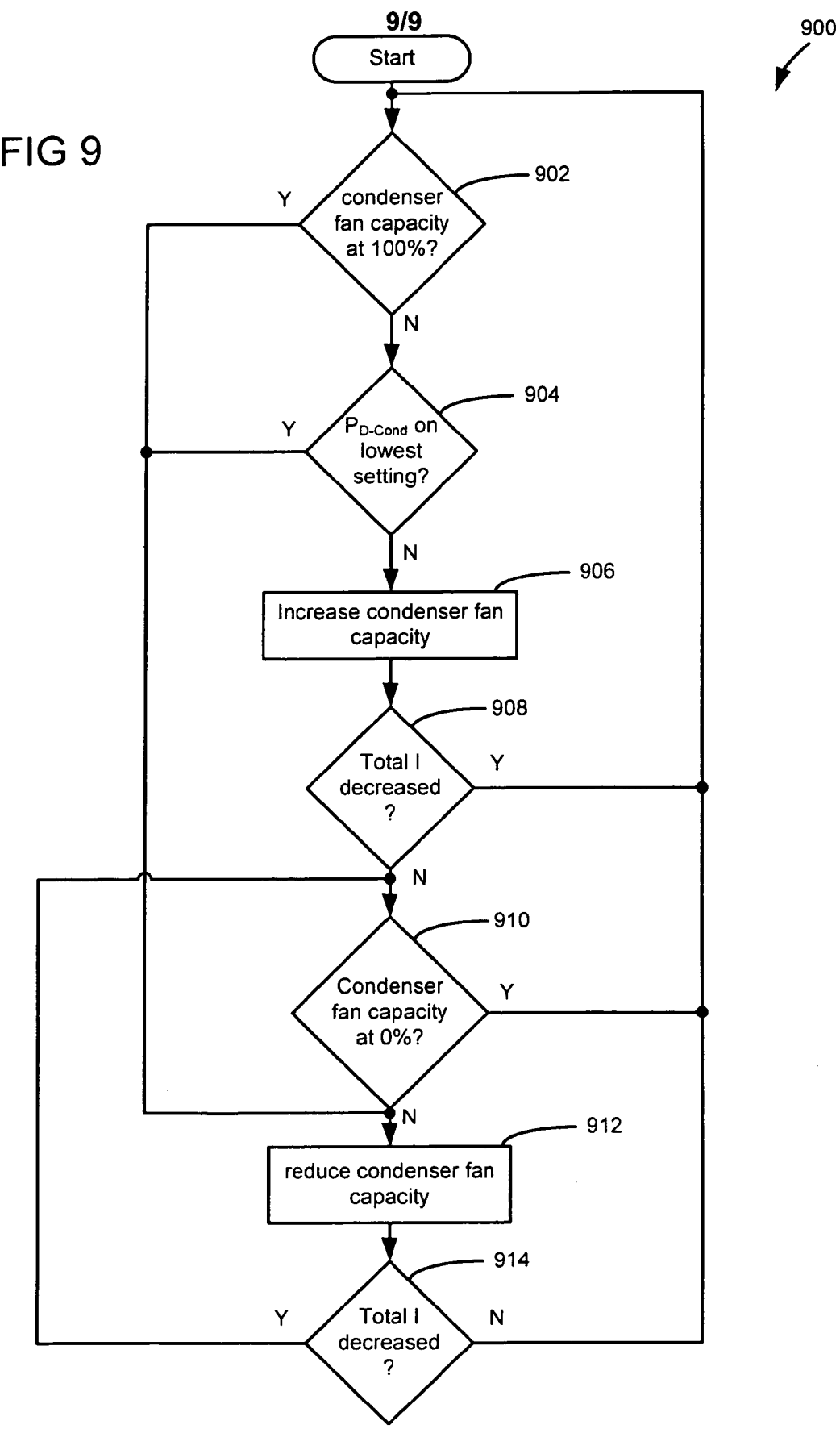
FIG. 9 is a flowchart illustrating a condenser fan control algorithm based on modulating a condenser fan capacity.

Referring now to FIG. 9, a condenser fan control algorithm 900 utilizing a direct control of condenser fan capacity based on power consumption is executed by the system controller 52. In step 902, the system controller 52 determines if the condenser fan capacity is at 100 percent. When condenser fan capacity is not at 100 percent, the system controller 52 proceeds to step 904 and determines whether $P_{D-Cond}$ is at the lowest setting. When $P_{D-Cond}$ is not at the lowest setting, the system controller 52 increases condenser fan capacity in step 906 and determines whether the total electrical current (I) decreases in step 908. When I decreases in step 908, the system controller 52 loops back to step 902.

In step 908 when I did not decrease, the system controller 52 proceeds to step 910 and determines whether condenser fan capacity is at 0 percent. When condenser fan capacity is at 0 percent, the system controller 52 loops back to step 902.

In step 902 when condenser fan capacity is at 100 percent, or in step 904 when $P_{D-Cond}$ is at the lowest setting, or in step 910 when condenser fan capacity is not at 0 percent, the system controller 52 reduces condenser fan capacity in step 912. In step 914, the system controller 52 determines whether I decreased. When I decreased in step 914, the system controller 52 loops back to step 910. When I did not decrease, the system controller 52 loops back to step 902.

In this way, the system controller 52 adjusts condenser fan capacity based on the current energy consumption of the refrigeration system 10. Energy consumption is optimized based on condenser discharge pressure and condenser fan capacity.

The description is merely exemplary in nature and, thus, variations that do not depart from the gist of the teachings are not to be regarded as a departure from the spirit and scope of the teachings.

What is claimed is:

1. A method comprising:
    monitoring an energy consumption of a compressor and at least one variable speed condenser fan of a refrigeration system;
    controlling said at least one variable speed condenser fan based on a condenser set-point;
    setting said condenser set-point to an initial value;
    recording a first energy consumption resulting from said initial value, said first energy consumption corresponding to total energy consumption during a predetermined period of a first day;
    setting said condenser set-point to a different value;
    recording a second energy consumption resulting from said different value, said second energy consumption corresponding to total energy consumption during a predetermined period of a second day;
    comparing said first energy consumption with said second energy consumption; and
    modulating said condenser set-point based on said energy consumption comparison.

2. The method of claim 1 wherein said controlling said speed of said at least one variable-speed condenser fan comprises controlling a frequency of electrical power delivered by a variable frequency drive to an electric motor of said at least one variable speed condenser fan.

3. The method of claim 2 wherein said monitoring said energy consumption of said condenser comprises receiving at least one of electrical current data and electrical power data from said variable frequency drive.

4. A computer-readable medium having computer-executable instructions for performing the method of claim 3.

5. The method of claim 2 wherein said variable frequency drive has a variable frequency mode and a bypass mode, said method further comprising controlling said frequency of electrical power at a desired frequency when operating in said variable frequency mode and controlling said frequency of electrical power at an input frequency when operating in said bypass mode.

6. The method of claim 5 further comprising receiving fault data from said variable frequency drive.

7. The method of claim 6 further comprising operating in said bypass mode when said fault data is received from said variable frequency drive.

8. A computer-readable medium having computer-executable instructions for performing the method of claim 2.

9. The method of claim 1 wherein said set-point comprises one of a temperature difference set-point, a condenser temperature set-point, and a condenser pressure set-point.

10. A computer-readable medium having computer-executable instructions for performing the method of claim 1.

11. A controller comprising:
a first input that receives a signal indicating an energy consumption value of a compressor;
a second input that receives a signal indicating an energy consumption value of at least one variable speed condenser fan driven by a variable frequency drive;
an output that provides a control signal to said at least one variable speed condenser fan that indicates a frequency of electrical power for said variable frequency drive to deliver to an electric motor of said at least one variable speed condenser fan;
a memory that stores a condenser set-point; and
a processor in communication with said input, output and memory and operable to set said condenser set-point to an initial value; record a first total energy consumption value resulting from said initial value; set said condenser set-point to a different value; record a second total energy consumption value resulting from said different value; compare said first total energy consumption value with said second total energy consumption value; and modulate said condenser set-point based on said energy consumption comparison;
wherein said first total energy consumption value corresponds to total energy consumption during a predetermined period of a first day and wherein said second total energy consumption value corresponds to total energy consumption during said predetermined period of a second day.

12. The controller of claim 11 wherein said energy consumption value of said at least one of condenser fan comprises at least one of a condenser fan electrical current value and a condenser fan electrical power value and wherein said energy consumption value of said at least one condenser fan is received from said variable frequency drive.

13. The controller of claim 11 wherein said processor determines a number of condenser fans connected to said variable frequency drive based on said energy consumption value of said at least one variable speed condenser fan.

14. The controller of claim 11 wherein said processor determines a horsepower rating of said electric motor based on said energy consumption value of said at least one variable speed condenser fan.

15. The controller of claim 14 wherein said processor detects a condenser malfunction based on said horsepower rating and based on said energy consumption value of said at least one variable speed condenser fan.

16. The controller of claim 11 wherein said variable frequency drive has a variable frequency mode wherein said frequency of electrical power is varied and a bypass mode wherein said frequency of electrical power is not varied.

17. The controller of claim 16 wherein said second input receives fault data from said variable frequency drive and wherein said control signal triggers said variable frequency drive to operate in said bypass mode when a variable frequency drive fault occurs.

18. The controller of claim 16 wherein said second input receives a signal indicating a variable frequency drive temperature value and wherein said control signal triggers said variable frequency drive to operate in said bypass mode when said variable frequency drive temperature value is greater than a predetermined variable frequency drive temperature maximum.

19. The controller of claim 16 wherein said control signal triggers said variable frequency drive to operate in said bypass mode when operating said at least one condenser fan at about full speed.

20. The controller of claim 16 wherein said second input receives an ambient temperature value and wherein said control signal triggers said variable frequency drive to operate in said bypass mode when said ambient temperature value is greater than a predetermined ambient temperature maximum.

21. The controller of claim 11 wherein said control signal triggers said variable frequency drive to reset.

22. The controller of claim 11 wherein said set-point comprises a temperature difference set-point.

23. The controller of claim 11 wherein said set-point comprises a condenser temperature set-point.

24. The controller of claim 11 wherein said set-point comprises a condenser pressure set-point.

25. The controller of claim 11 wherein said second input receives a signal indicating an ambient temperature value, and wherein said processor:
calculates a first energy-temperature ratio based on said first total energy consumption value and said ambient temperature value;
calculates a second energy-temperature ratio based on said second total energy consumption value and said ambient temperature value; and
modulates said condenser set-point based on said first and second energy-temperature ratios.

26. The controller of claim 25 wherein said processor:
compares said first energy-temperature ratio with said second energy-temperature ratio; and
modulates said condenser set-point based on said ratio comparison.

27. The controller of claim 25 wherein said processor:
calculates an energy ratio difference as a difference between said first energy-temperature ratio and said second energy-temperature ratio;
calculates a set-point difference as a difference between said initial value and said different value;
calculates a comparison factor as a one of a product and a quotient of said energy ratio difference and said set-point difference; and
modulates said condenser set-point based on said comparison factor.

28. The controller of claim 27 wherein said processor determines a sign of said comparison factor and modulates said condenser set-point based on said sign.

29. The controller of claim 11 wherein said processor:
sets said condenser set-point to an initial value;
changes said condenser set-point in an initial direction; and
determines a resulting energy consumption change;
wherein said processor changes said condenser set-point in an opposite direction of said initial direction when said resulting energy consumption change is positive and changes said condenser set-point in said initial direction when said resulting energy consumption change is negative.

30. A controller comprising:
a first input that receives a signal indicating an energy consumption of a compressor;
a second input that receives a signal indicating an energy consumption of at least one variable speed condenser fan;
a processor in communication with said first and second inputs, wherein said processor: records a first total energy consumption resulting from operating said at least one variable speed condenser fan at a first capacity during a predetermined period of a first day; records a second total energy consumption resulting from operating said at least one variable speed condenser fan at a second capacity during said predetermined period of a second day; and modulates capacity of said at least one variable speed condenser fan, based on a comparison of said first total energy consumption with said second total energy consumption.

31. The controller of claim 30 wherein said predetermined period is a predetermined hour of said first and second days.

32. The controller of claim 30 wherein said processor modulates capacity of said at least one variable speed condenser fan by modulating a condenser set-point.

33. The controller of claim 30 wherein said processor modulates capacity of said at least one variable speed condenser fan by modulating condenser fan speed.

34. The controller of claim 33 wherein said processor modulates condenser fan speed by modulating a variable frequency drive of said at least one condenser fan.

35. The controller of claim 30 wherein said processor records total energy consumption for each period of a plurality of predetermined periods of a first day, records total energy consumption for each period of said plurality of predetermined periods of a second day, and modulates capacity of said at least one variable speed condenser fan, based on comparing total energy consumption for each period of said first day with total energy consumption for each corresponding period of said second day.

* * * * *